United States Patent [19]

Asterö

[11] Patent Number: 4,537,474
[45] Date of Patent: Aug. 27, 1985

[54] OPTICAL SYSTEM FOR PROJECTION

[75] Inventor: Ulf J. Asterö, Tumba, Sweden

[73] Assignee: Optik Innovation AB OIAB, Tumba, Sweden

[21] Appl. No.: 355,757

[22] PCT Filed: Jul. 29, 1981

[86] PCT No.: PCT/SE81/00223
§ 371 Date: Feb. 25, 1982
§ 102(e) Date: Feb. 25, 1982

[87] PCT Pub. No.: WO82/00529
PCT Pub. Date: Feb. 18, 1982

[30] Foreign Application Priority Data

Jul. 30, 1980 [SE] Sweden .............................. 8005475

[51] Int. Cl.³ .......................... G02B 3/04; G02B 9/02; G03B 21/56
[52] U.S. Cl. .................................... 350/432; 350/122; 350/125; 350/412; 350/448
[58] Field of Search ............... 350/432, 448, 412, 433, 350/435, 122, 125

[56] References Cited

U.S. PATENT DOCUMENTS 3,778,133  12/1973  Tatian .......................... 350/432 X
4,181,409  1/1980   Whitney et al. ................ 350/432 X
4,289,387  9/1981   Jalie ............................ 350/432 X Primary Examiner—John K. Corbin
Assistant Examiner—Scott J. Sugarman
Attorney, Agent, or Firm—Burns, Doane, Swecker & Mathis

[57] ABSTRACT

An optical system for projection with a projector apparatus intended to project an image on a screen made with negative curvature includes a single, generally concavo-convex lens, both surfaces of which are aspherically corrected, and the front surface of which is oriented towards the plane of the object. The lens is provided with a diaphragm arranged behind the lens at a distance therefrom at least amounting to that of the diaphragm aperture. The display screen preferably has the form of a hyperboloid with splayed-out edges. The optical system is made with a numerical aperture of 0.09 and is intended to afford an enlargement of 6 to 10 times for objects of the format 190×250 mm. The optical system is suitably adapted for an overhead projector and has a Gauss focal length of 230 mm. The lens can be made from methyl methacrylate.

9 Claims, 16 Drawing Figures

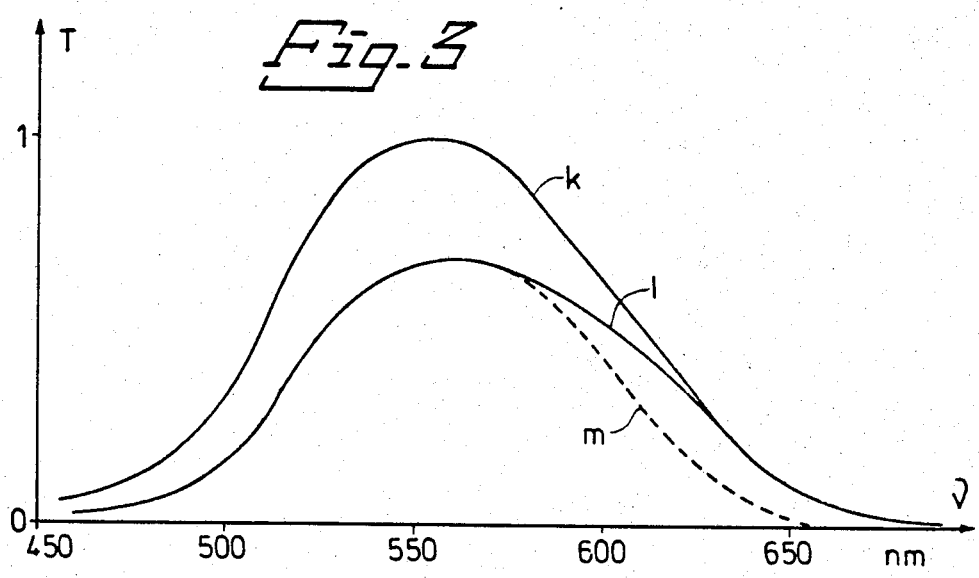
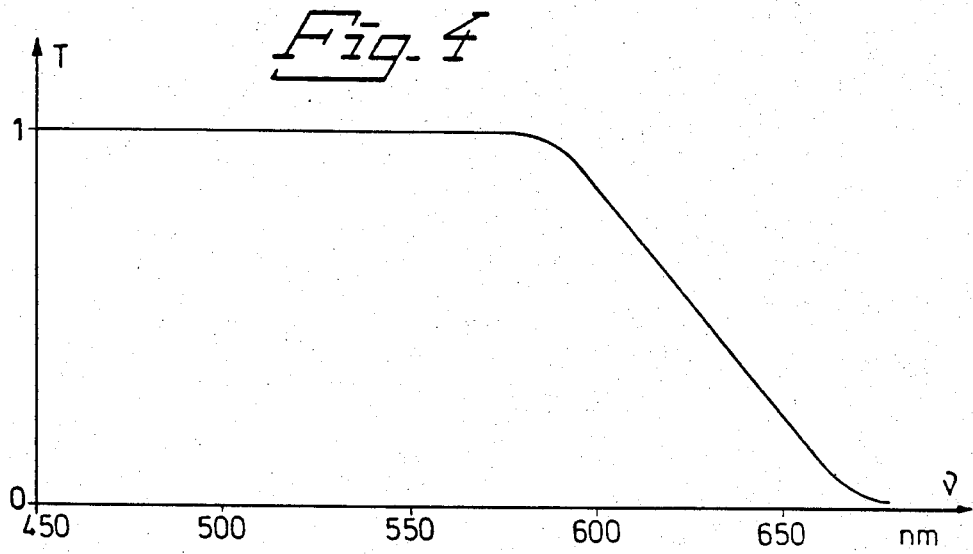

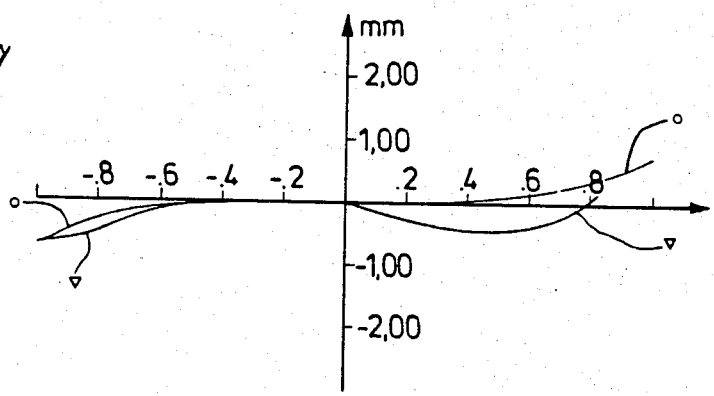
Fig.6a  0/94
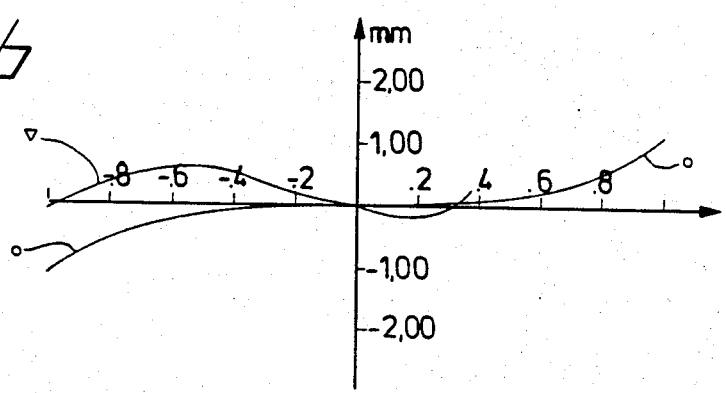
Fig.6b  0/126
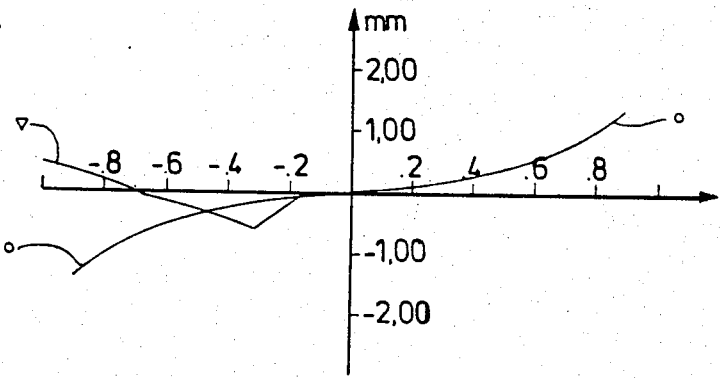
Fig.6c  0/157

0/ 0

0/ 31

0/ 63

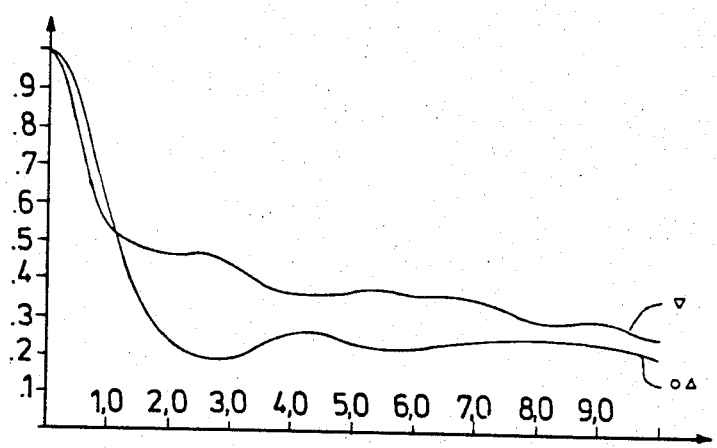
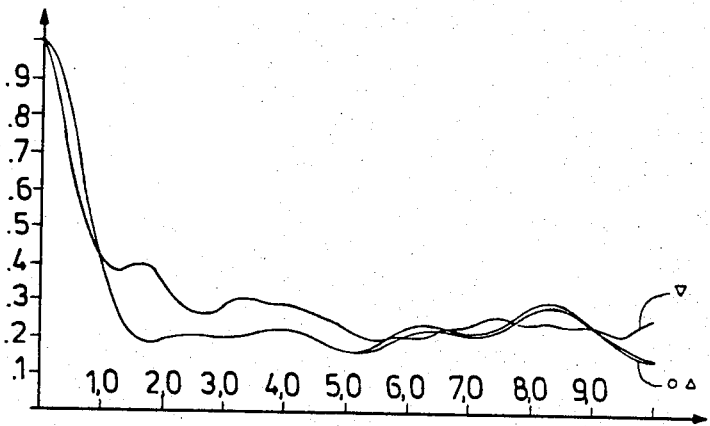
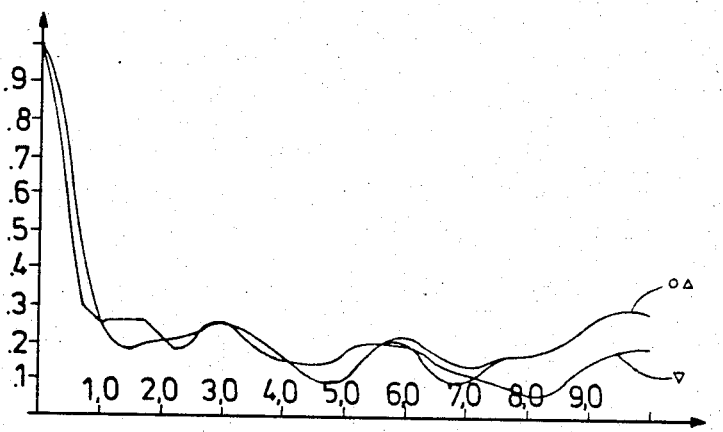

OPTICAL SYSTEM FOR PROJECTION

TECHNICAL FIELD

The invention relates to an optical system for a projection apparatus, which is preferably intended for projecting an image on a display screen with generally negative curvature.

BACKGROUND ART

In the construction of projection objectives with relatively short Gauss focal length, e.g. for portable overhead projectors, the conventional method has been to make the objective with a small aperture, in order to obtain with few lenses, a generally acceptable image quality. An optical system is thus afforded which can be produced at relatively low costs and which has relatively small dimensions and low weight, so that the condition of portability is satisfied, but with the disadvantage that such an optical system at best only allows acceptable projection of very highly luminous objects such as transparencies or the like.

An attempt to make an objective allowing acceptable image quality and light strength, even when projecting objects of relatively small luminosity, is disclosed in the Swedish Pat. No. 7407134-1. Such an objective includes a modified triplet supplemented by a large positive lens a long way in front of the triplet. This kind of objective has indeed a large aperture, and affords acceptable image quality, but as indicated, it requires four large lens elements and the Gauss focal length needs to be about 600 mm, in order that the projector operator can manipulate the image of the object. Due to the necessary size and weight of the objective, as well as the large number of lenses necessary for it, this previously known objective is neither economically acceptable nor compatible with the portability requirement.

The conviction of those skilled in the art has been that a proper projection objective must include a plurality of lens elements, even if some lens surface has been given an aspheric correction. The technique of aspherically correcting a lens surface for reducing certain image reproduction errors or aberrations is known, but is commercially limited, since the cost of producing such lenses is relatively high. It has therefore appeared as being more economically favourable in the construction of a projector objective to increase the number of lens elements therein, if it is desired to improve the resulting image quality, instead of aspherically correcting any of the lens surfaces in the objective since, as mentioned, such persons were convinced that the objective necessarily must include a plurality of lens elements in order to avoid the most serious aberrations.

PURPOSE OF INVENTION

One purpose of the invention is to propose an objective structure for projectors, said structure having a short Gauss focal length, great numerical aperture, high image quality, low weight and a small number of lens elements, so that an overhead projector, for example, equipped with such an optical system will actually be light in weight, meet the portability condition, and with acceptable visual quality be capable of depicting objects which are less luminous, such as epidiascope pictures, i.e. non-transparent pictures illuminated by an ordinary light source from above.

Extremely surprisingly, it has now been found possible to achieve said purpose by means of an objective of the kind apparent from the appended patent claims. Especially surprisingly is the fact that the objective only needs to contain a single lens element of generally concavo-convex or plano-convex type, the convex surface of which is directed towards the plane of the object. Both the surfaces of the lens will be aspherically corrected, preferably so that in annular areas concentric with the lens axis there will be a positive deviation in the vicinity of said axis, negative deviation in an intermediate annular area and positive deviation in an outmost annular area, the deviation being related to the sphere best fitting the respective lens surface. The correction has continuous first and second order derivatives which are $=0$ in the axial point. The aspherical correction of both lens surfaces can be simultaneously calculated by means of methods already known in principle. The lens is also provided with a diaphragm arranged behind said lens at a distance therefrom at least corresponding to the aperture of the diaphragm. The optical system is preferably adapted for projecting the image on a display screen made with a generally negative curvature, which may have hyperboloidal form with splayed-out edges. By means of apparatus thus executed there is achieved that the quality of the projected image, in contradiction to the prejudices of those skilled in the art, will be fully acceptable, thus accomplishing with said apparatus the purposes described above. The lens will suitably be made with a relatively short Gauss focal length of 230 mm, for example, whereby the longitudinal color error is reduced as well as projector apparatus equipped with this optical system being given relatively small dimensions, so that the portability requirement is achieved. If the lens is manufactured from a plastics such as methyl methacrylate with a D-refractive index of 1.49166 and $\nu = 57.37$, with a diameter of 100 mm and a thickness of 18 mm, the lens will have a weight of about 150 g. The optical system affords a magnification of about 6–10 times at a projection distance of between 1.7 and 2.7 m, and the field curvature problem is thereby reduced by the display screen being executed with a relatively severe negative curvature, and preferably given the form of a hyperboloid with splayed-out edges. This gives, inter alia, the advantage that the slope of the screen in the peripheral portions is kept relatively small.

By the stated placing of the diaphragm, there is achieved that the variation on the object side of the field angle will be comparatively small. In the preferred embodiment, in which the diaphragm aperture is 45 mm, the diaphragm should lie about 50 mm behind the lens, although at most about 120 mm behind the lens. By selecting about 70 mm to be the distance, there is afforded space between the lens and the diaphragm for a supplementary objective therebetween. The supplementary objective can be provided with a holder for film material carrying scaled-down information. e.g. a microfiche or 24×36 mm transparencies, or the like, the supplementary objective suitably being adapted for providing, in combination with the objective, substantially the same picture size of the nominal object as for said information. A deflecting mirror, normally required when the objective is to be utilized in an overhead projector, can suitably be placed at the diaphragm.

The inventive objective suitably has a Gauss focal length <400 mm.

The invention will now be described in detail in the form of an example, while referring to the accompanying drawing.

BRIEF DESCRIPTION OF DRAWING

FIG. 3 illustrates the transmission through the optical system.

FIG. 4 illustrates a suitable filter for adjusting the transmission to visual sensitivity (indicated in FIG. 3).

FIGS. 6a-6c illustrate the meridonal and sagittal aberration of the optical system for a wavelength at some other field points.

FIGS. 7a-7f illustrate the modulation of the optical system at different field points.

PREFERRED EMBODIMENT

Figure 1:
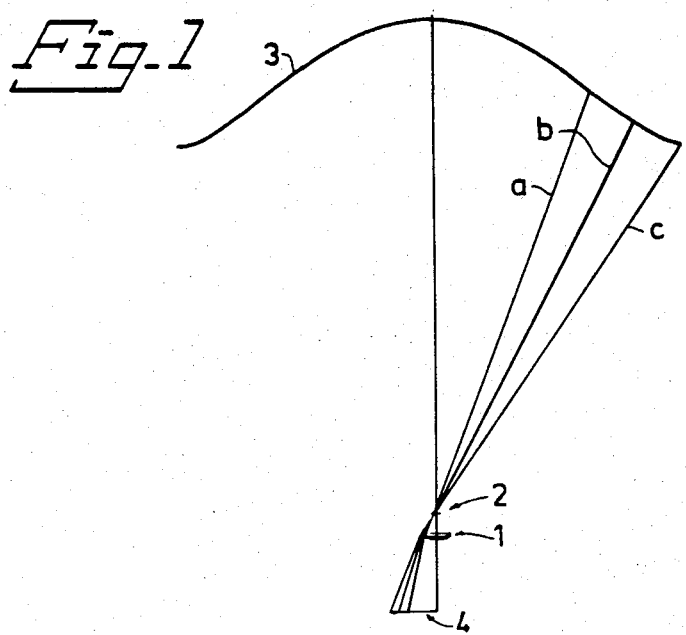
FIG. 1 is a section through an apparatus in accordance with the invention, certain edge rays being indicated.

An optical system in accordance with the invention includes a single, generally concavo-convex lens 1 provided with a diaphragm 2, the optical system formed by lens and diaphragm being intended to project an image on a display screen 3 with generally negative curvature (see FIG. 1).

For the particular purpose of utilizing the inventive apparatus in an overhead projector, the apparatus is formed with the following prerequisites and data.

| Object: | 190 × 250 mm |
|---|---|
| Gaussian focal length of lens | 230 mm |
| Lens material: methyl methacrylate with D-refractive index | 1.49166 and ν = 57.37 |
| Lens diameter: | 100 mm |

Front surface of lens; best suited sphere with a radius of 108.804 mm, the aspherical correction being carried out in accordance with the following table.

| | Lens front surface | | |
|---|---|---|---|
| Semi-aperture (mm) | Deviation from best suited sphere (mm) | Deviation from tangent plane (mm) | Slope of surface degrees |
| 0.00000 | 0.00000 | 0.00000 | 0.00000 |
| 1.00000 | .00026 | .00485 | .55504 |
| 2.00000 | .00095 | .01933 | 1.10239 |
| 3.00000 | .00193 | .04330 | 1.64211 |
| 4.00000 | .00307 | .07662 | 2.17428 |
| 5.00000 | .00424 | .11919 | 2.69898 |
| 6.00000 | .00530 | .17087 | 3.21630 |
| 7.00000 | .00613 | .23154 | 3.72633 |
| 8.00000 | .00658 | .30108 | 4.22920 |
| 9.00000 | .00653 | .37940 | 4.72500 |
| 10.00000 | .00584 | .46636 | 5.21386 |
| 11.00000 | .00442 | .56189 | 5.70160 |
| 12.00000 | .00231 | .66607 | 6.19401 |
| 13.00000 | −.00043 | .77899 | 6.69117 |
| 14.00000 | −.00372 | .90074 | 7.19315 |
| 15.00000 | −.00749 | 1.03144 | 7.70000 |
| 16.00000 | −.01167 | 1.17119 | 8.21181 |
| 17.00000 | −.01618 | 1.32010 | 8.72863 |
| 18.00000 | −.02095 | 1.47829 | 9.25051 |
| 19.00000 | −.02591 | 1.64588 | 9.77752 |
| 20.00000 | −.03098 | 1.82298 | 10.30970 |
| 21.00000 | −.03607 | 2.00974 | 10.84872 |
| 22.00000 | −.04106 | 2.20633 | 11.39620 |
| 23.00000 | −.04582 | 2.41294 | 11.95216 |
| 24.00000 | −.05020 | 2.62976 | 12.51659 |
| 25.00000 | −.05408 | 2.85700 | 13.08948 |
| 26.00000 | −.05730 | 3.09486 | 13.67081 |
| 27.00000 | −.05975 | 3.34354 | 14.26055 |
| 28.00000 | −.06126 | 3.60326 | 14.85867 |
| 29.00000 | −.06171 | 3.87423 | 15.46513 |
| 30.00000 | −.06095 | 4.15667 | 16.07987 |
| 31.00000 | −.05890 | 4.45076 | 16.69456 |
| 32.00000 | −.05566 | 4.75647 | 17.30107 |
| 33.00000 | −.05141 | 5.07371 | 17.89966 |
| 34.00000 | −.04633 | 5.40241 | 18.49062 |
| 35.00000 | −.04057 | 5.74251 | 19.07424 |
| 36.00000 | −.03430 | 6.09395 | 19.65081 |
| 37.00000 | −.02769 | 6.45666 | 20.22066 |
| 38.00000 | −.02090 | 6.83061 | 20.78410 |
| 39.00000 | −.01410 | 7.21574 | 21.34148 |
| 40.00000 | −.00743 | 7.61203 | 21.89315 |
| 41.00000 | −.00114 | 8.01938 | 22.42867 |
| 42.00000 | .00426 | 8.43739 | 22.93793 |
| 43.00000 | .00816 | 8.86562 | 23.42181 |
| 44.00000 | .00998 | 9.30363 | 23.88119 |
| 45.00000 | .00913 | 9.75097 | 24.31693 |
| 46.00000 | .00501 | 10.20723 | 24.72993 |
| 47.00000 | −.00295 | 10.67200 | 25.12105 |
| 48.00000 | −.01534 | 11.14487 | 25.49118 |
| 49.00000 | −.03274 | 11.62544 | 25.84121 |
| 50.00000 | −.05571 | 12.11336 | 26.17204 |

The back surface of the lens: best suited sphere with a radius of 1651.582 mm, the aspherical correction being carried out with the following data:

| | Lens back surface | | |
|---|---|---|---|
| Semi-aperture (mm) | Deviation from best suited sphere (mm) | Deviation from tangent plane (mm) | Slope of surface degrees |
| 0.00000 | 0.00000 | 0.00000 | 0.00000 |
| 1.00000 | .00017 | .00047 | .05250 |
| 2.00000 | .00058 | .00179 | .09750 |
| 3.00000 | .00110 | .00383 | .13500 |
| 4.00000 | .00161 | .00646 | .16500 |
| 5.00000 | .00198 | .00954 | .18749 |
| 6.00000 | .00206 | .01296 | .20249 |
| 7.00000 | .00173 | .01657 | .20999 |
| 8.00000 | .00087 | .02025 | .20999 |
| 9.00000 | −.00067 | .02386 | .20248 |
| 10.00000 | −.00300 | .02727 | .18748 |
| 11.00000 | −.00623 | .03040 | .17254 |
| 12.00000 | −.01026 | .03334 | .16521 |
| 13.00000 | −.01495 | .03621 | .16549 |
| 14.00000 | −.02018 | .03916 | .17338 |
| 15.00000 | −.02581 | .04231 | .18888 |
| 16.00000 | −.03171 | .04580 | .21200 |
| 17.00000 | −.03774 | .04975 | .24273 |
| 18.00000 | −.04378 | .05431 | .28107 |
| 19.00000 | −.04968 | .05961 | .32703 |
| 20.00000 | −.05533 | .06577 | .38060 |
| 21.00000 | −.06058 | .07293 | .44093 |
| 22.00000 | −.06533 | .08120 | .50717 |
| 23.00000 | −.06949 | .09067 | .57933 |
| 24.00000 | −.07293 | .10146 | .65739 |
| 25.00000 | −.07557 | .11365 | .74137 |
| 26.00000 | −.07729 | .12737 | .83125 |
| 27.00000 | −.07801 | .14271 | .92705 |
| 28.00000 | −.07760 | .15977 | 1.02875 |
| 29.00000 | −.07597 | .17865 | 1.13635 |
| 30.00000 | −.07302 | .19947 | 1.24986 |
| 31.00000 | −.06868 | .22227 | 1.36065 |
| 32.00000 | −.06312 | .24691 | 1.46009 |
| 33.00000 | −.05653 | .27319 | 1.54818 |
| 34.00000 | −.04910 | .30090 | 1.62494 |
| 35.00000 | −.04104 | .32986 | 1.69035 |

Lens back surface

| Semi-aperture (mm) | Deviation from best suited sphere (mm) | Deviation from tangent plane (mm) | Slope of surface degrees |
| --- | --- | --- | --- |
| 36.00000 | −.03254 | .35986 | 1.74442 |
| 37.00000 | −.02380 | .39070 | 1.78716 |
| 38.00000 | −.01502 | .42219 | 1.81857 |
| 39.00000 | −.00640 | .45414 | 1.83864 |
| 40.00000 | .00188 | .48633 | 1.84738 |
| 41.00000 | .00953 | .51852 | 1.83409 |
| 42.00000 | .01606 | .55018 | 1.78805 |
| 43.00000 | .02090 | .58076 | 1.70926 |
| 44.00000 | .02347 | .60968 | 1.59771 |
| 45.00000 | .02319 | .63635 | 1.45339 |
| 46.00000 | .01951 | .66023 | 1.27630 |
| 47.00000 | .01183 | .68072 | 1.06642 |
| 48.00000 | −.00039 | .69727 | .82374 |
| 49.00000 | −.01775 | .70929 | .54825 |
| 50.00000 | −.04081 | .71621 | .23997 |

Diaphragm: semi-aperture 22.41 mm (corresponding to initial iris), the distance between the back surface of the lens and diaphragm being substantially 73 mm. Lens thickness: 18 mm.

The optical system thus constructed affords a magnification of about 6× with the object distance of 1645 mm and a magnification of about 10× for the object distance of 2700 mm. For a magnification of 6× (see FIG. 1) the display screen can be carried out with a best suited sphere having a radius of −1200 mm, relative to which the surface of the screen has the following data:

Screen surface

| Semi-aperture (mm) | Deviation from best suited sphere (mm) | Deviation from tangent plane (mm) | Slope of surface degrees |
| --- | --- | --- | --- |
| 0.00000 | 0.00000 | 0.00000 | 0.00000 |
| 25.00000 | −.26030 | −.52074 | −2.38512 |
| 50.00000 | −1.03977 | −2.08189 | −4.75707 |
| 75.00000 | −2.33415 | −4.68020 | −7.10306 |
| 100.00000 | −4.13636 | −8.31029 | −9.41102 |
| 125.00000 | −6.43651 | −12.96468 | −11.66984 |
| 150.00000 | −9.22190 | −18.63381 | −13.86958 |
| 175.00000 | −12.47705 | −25.30604 | −16.00158 |
| 200.00000 | −16.18360 | −32.96764 | −18.05843 |
| 225.00000 | −20.32030 | −41.60276 | −20.03398 |
| 250.00000 | −24.86280 | −51.19333 | −21.92315 |
| 275.00000 | −29.78353 | −61.71888 | −23.72183 |
| 300.00000 | −35.05139 | −73.15637 | −25.42659 |
| 325.00000 | −40.63143 | −85.47991 | −27.03453 |
| 350.00000 | −46.48435 | −98.66030 | −28.54302 |
| 375.00000 | −52.56601 | −112.66467 | −29.94942 |
| 400.00000 | −58.82668 | −127.45580 | −31.25087 |
| 425.00000 | −65.21028 | −142.99146 | −32.44403 |
| 450.00000 | −71.65341 | −159.22360 | −33.52480 |
| 475.00000 | −78.08423 | −176.09734 | −34.48805 |
| 500.00000 | −84.42118 | −193.54992 | −35.32725 |
| 525.00000 | −90.57152 | −211.50938 | −36.03416 |
| 550.00000 | −96.42968 | −229.89317 | −36.59830 |
| 575.00000 | −101.87535 | −248.60656 | −37.00638 |
| 600.00000 | −106.77140 | −267.54084 | −37.24155 |
| 625.00000 | −110.96154 | −286.57140 | −37.28238 |
| 650.00000 | −114.26767 | −305.55553 | −37.10150 |
| 675.00000 | −116.48696 | −324.33012 | −36.66376 |
| 700.00000 | −117.38862 | −342.70907 | −35.92378 |
| 725.00000 | −116.71021 | −360.48051 | −34.82253 |
| 750.00000 | −114.15365 | −377.40381 | −33.28282 |
| 775.00000 | −109.38062 | −393.20637 | −31.20349 |
| 800.00000 | −102.00744 | −407.58008 | −28.45240 |
| 825.00000 | −91.59915 | −420.17771 | −24.85972 |
| 850.00000 | −77.66278 | −430.60887 | −20.21604 |
| 875.00000 | −59.63938 | −438.43577 | −14.28647 |
| 900.00000 | −36.89445 | −443.16881 | −6.86307 |

TOLERANCES

The tolerance for a parallel displacement of both the axes of symmetry of the lens is 0.137 mm.

The tolerance for a relative tilt of these axes is 0.5°.

Maximum permitted axial deviation from the desired surface is −0.597 E-01 and 0.787 E-02 for the back lens surface and −0.507 E-03 and 0.371 E-01 for the front surface.

The maximum permitted deviation in the derivatives of the surfaces converted to degrees for the back lens surface is −0.007168° and 0.001154° and for the front surface −0.000091 and 0.004412°.

It has been found that the lens is relatively insensitive to deformation of the type brought about by pressing on the centre of the lens.

Both surfaces of the lens element are suitably coated with an anti-reflex coating of the single layer type. Single layer deposits of the type MGF2 with a thickness of 103.26 nonometer and a refractive index of 1.38000 can be utilized. FIG. 3 illustrates the resulting transmission of the optical system as a function of the wavelength.

An optical system executed according to the explicit embodiment example has the following distorsion:

| Field point | Distorsion % | Relative differential radial enlargement from object to image |
| --- | --- | --- |
| 0/0 | 0 | 1 |
| 0/116 | −16.7 | 0.69 |
| 0/157 | −18.0 | 0.96 |

Distortion and relative differential enlargement have been defined in a direction normal to the optical axis. The field points relate to abscissae and ordinates in image points normalized to image width 200 mm.

The color enlargement error is less than in the modified triplet according to the Swedish patent specification 7407134-1, and the vignettement is about 65% in the corner.

Figure 2:
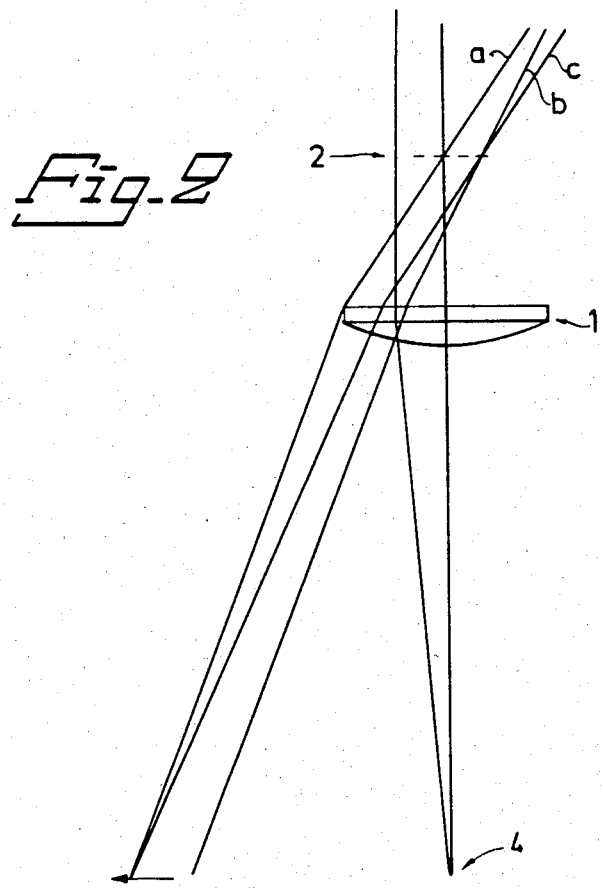
FIG. 2 is a section through the optical system with diaphragm.
Figure 5A:
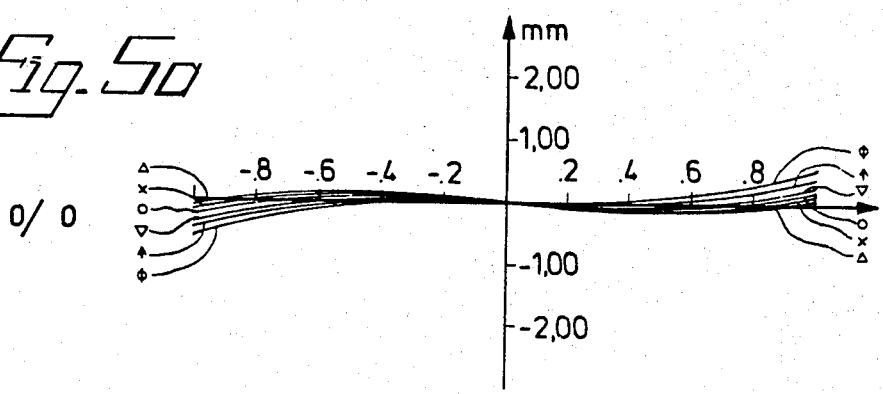
FIGS. 5a-5c illustrate the aberrations of the optical system for certain wavelengths at some field points.
Figure 5B:
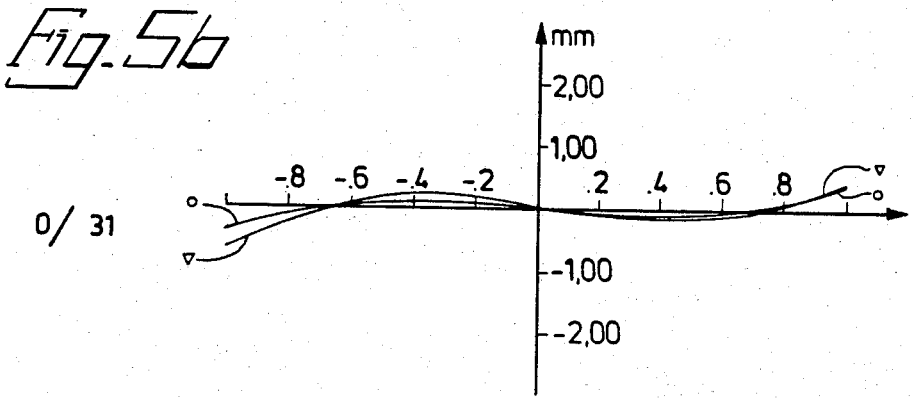
Figure 5C:
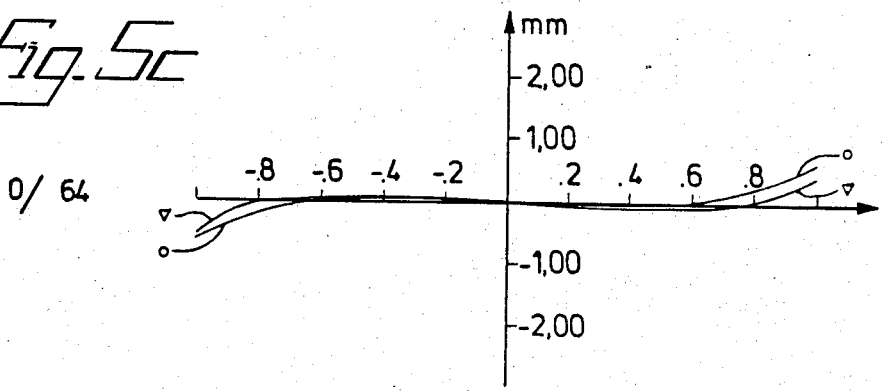
Figure 7A:
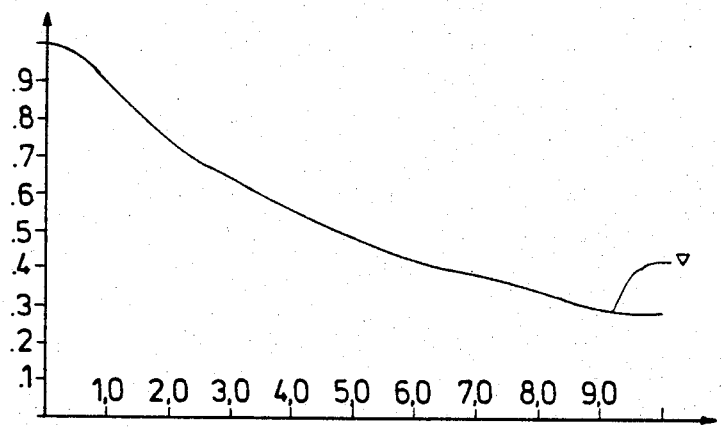
Figure 7B:
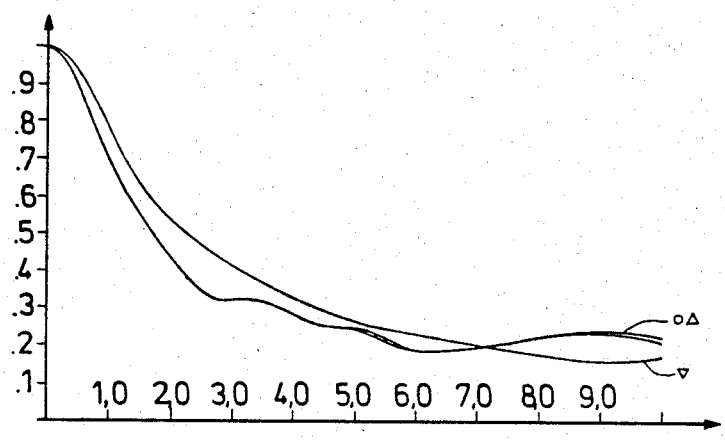
Figure 7C:
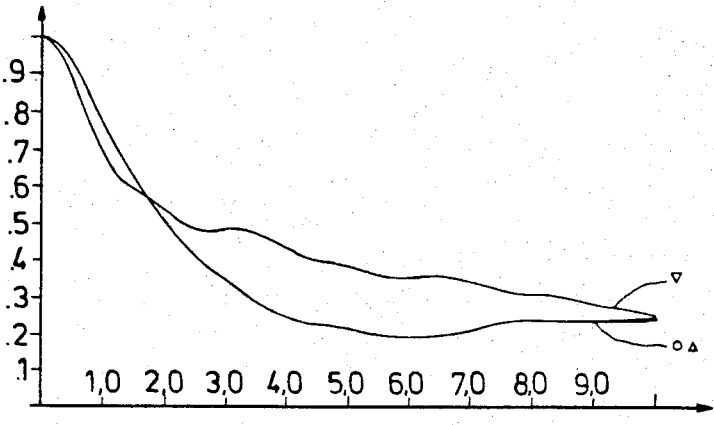

FIG. 1 is an axial section through an apparatus in accordance with the invention, edge rays for a the middle of the side edge, b middle of the upper-lower edge, and c corner of the object 4 (190×250 mm) being shown. FIG. 2 is the objective portion to a larger scale of an inventive apparatus, the marginal rays for the corners of the object c and the middle of the upper edge b of the object being indicated.

FIG. 3 illustrates (in a transmission T/wave length υ graph) the transmission factor 1 of the optical system when the object is illuminated by a lamp at the temperature of 3200° Kelvin (halogen lamp) as appreciated by the human eye. The spectrum sensitivity of the human eye k is also illustrated in FIG. 3. In FIG. 3 there is furthermore illustrated the transmission factor m for the optical system when it has been corrected by a short-pass filter of the type illustrated in FIG. 4, (wherein T shows transmission of υ wavelength in nm), whereby the resulting transmission factor m of the optical system will be substantially symmetrical to curve k. FIGS. 5a–5c, 6a–6c and 7a–7f illustrate the properties of the system at different field points, which relate to abscissae and ordinates in image points normalized to image width 200 (mm).

In FIG. 5 the following symbols are used:
∇ which refers to meredional aberration at wavelength 0.5700
φ which refers to meredional aberration at wavelength 0.4000
Δ which refers to meredional aberration at wavelength 0.6500
↑ which refers to meredional aberration at wavelength 0.5300
× which refers to meredional aberration at wavelength 0.6100
O which refers to sagittal aberration at wavelength 0.5700

In FIG. 6 the following symbols are used:
∇ which refers to meredional aberration wavelength 0.5700
O which refers to sagittal aberration at wavelength 0.5700

In FIG. 7 the following symbols are used:
∇ MTF at orientation angle 0.0
O MTF at orientation angle 90.0
Δ real part of OTF at orientation angle 90.0.

In FIGS. 5a–5c and FIGS. 6a–6c the abscissa indicates relative aperture and the ordinate indicates the aberration in mm.

In FIGS. 7a–7f the abscissa indicates lines per mm and the ordinate indicates the modulation.

In FIGS. 5–7 the graphs have been normalized to the 250×190 mm object.

The calculated MTF graphs in the peripheral parts of the image are primarily a mirroring of the color enlargement error in a radial direction (90°). A considerably better result would be obtained monochromatically. It will be seen that the MTF almost entirely coincides with the real portion of the OTF, and the conclusion can thus be drawn that the phase does not affect the information content of the image to any notable degree.

I claim:

1. An optical system for a projector apparatus which is preferably adapted for projecting an image on a display screen with a generally negative curvature, characterized in that the system includes a single-element lens with a generally convex front surface oriented towards the object plane and with a generally non-parallel concave rear surface, both surfaces of the lens being aspherically corrected so that in annular areas concentric with the lens axis the lens surfaces have positive deviation in the vicinity of said axis, then negative deviation, and outmost positive deviation, said deviation being related to the best suited sphere for the respective lens surface, wherein the best suited sphere for the front and back surfaces of the lens has radii of the order of magnitude +110 mm and +1650 mm, respectively, and in that the lens is provided with a diaphragm having an aperture of about 45 mm and being arranged about 70 mm in front of the back lens surface, and the lens has an aperture attaining about 100 mm, said system being suited to projecting an object with a format of the order of magnitude of 190×250 mm with an enlargement of about 6 to 8 times.

2. An optical system as claimed in claim 1, characterized in that the best suited sphere for the front and back surfaces of the lens has radii of 108.804 mm and 1651.582 mm, respectively.

3. An optical system as claimed in claim 2, characterized in that the distance between the back surface of the lens and the diaphragm is substantially 73 mm, and that the distance between the front and back surfaces of the lens is 18 mm.

4. An optical system as claimed in claim 1, characterized in that the lens consists of methyl methacrylate with a D-refractive index of 1.49166 and ν=57.37.

5. An optical system as claimed in any one of claims 2, 3 or 4, characterized in that the surfaces of the lens have the following numerical data:

| | Lens front surface | | |
| --- | --- | --- | --- |
| Semi-aperture (mm) | Deviation from best suited sphere (mm) | Deviation from tangent plane (mm) | Slope of surface degrees |
| 0.00000 | 0.00000 | 0.00000 | 0.00000 |
| 1.00000 | .00026 | .00485 | .55504 |
| 2.00000 | .00095 | .01933 | 1.10239 |
| 3.00000 | .00193 | .04330 | 1.64211 |
| 4.00000 | .00307 | .07662 | 2.17428 |
| 5.00000 | .00424 | .11919 | 2.69898 |
| 6.00000 | .00530 | .17087 | 3.21630 |
| 7.00000 | .00613 | .23154 | 3.72633 |
| 8.00000 | .00658 | .30108 | 4.22920 |
| 9.00000 | .00653 | .37940 | 4.72500 |
| 10.00000 | .00584 | .46636 | 5.21386 |
| 11.00000 | .00442 | .56189 | 5.70160 |
| 12.00000 | .00231 | .66607 | 6.19401 |
| 13.00000 | −.00043 | .77899 | 6.69117 |
| 14.00000 | −.00372 | .90074 | 7.19315 |
| 15.00000 | −.00749 | 1.03144 | 7.70000 |
| 16.00000 | −.01167 | 1.17119 | 8.21181 |
| 17.00000 | −.01618 | 1.32010 | 8.72863 |
| 18.00000 | −.02095 | 1.47829 | 9.25051 |
| 19.00000 | −.02591 | 1.64588 | 9.77752 |
| 20.00000 | −.03098 | 1.82298 | 10.30970 |
| 21.00000 | −.03607 | 2.00974 | 10.84872 |
| 22.00000 | −.04106 | 2.20633 | 11.39620 |
| 23.00000 | −.04582 | 2.41294 | 11.95216 |
| 24.00000 | −.05020 | 2.62976 | 12.51659 |
| 25.00000 | −.05408 | 2.85700 | 13.08948 |
| 26.00000 | −.05730 | 3.09486 | 13.67081 |
| 27.00000 | −.05975 | 3.34354 | 14.26055 |
| 28.00000 | −.06126 | 3.60326 | 14.85867 |
| 29.00000 | −.06171 | 3.87423 | 15.46513 |
| 30.00000 | −.06095 | 4.15667 | 16.07987 |
| 31.00000 | −.05890 | 4.45076 | 16.69456 |
| 32.00000 | −.05566 | 4.75647 | 17.30107 |
| 33.00000 | −.05141 | 5.07371 | 17.89966 |
| 34.00000 | −.04633 | 5.40241 | 18.49062 |
| 35.00000 | −.04057 | 5.74251 | 19.07424 |
| 36.00000 | −.03430 | 6.09395 | 19.65081 |
| 37.00000 | −.02769 | 6.45666 | 20.22066 |
| 38.00000 | −.02090 | 6.83061 | 20.78410 |
| 39.00000 | −.01410 | 7.21574 | 21.34148 |
| 40.00000 | −.00743 | 7.61203 | 21.89315 |
| 41.00000 | −.00114 | 8.01938 | 22.42867 |
| 42.00000 | .00426 | 8.43739 | 22.93793 |
| 43.00000 | .00816 | 8.86562 | 23.42181 |
| 44.00000 | .00998 | 9.30363 | 23.88119 |
| 45.00000 | .00913 | 9.75097 | 24.31693 |
| 46.00000 | .00501 | 10.20723 | 24.72993 |
| 47.00000 | −.00295 | 10.67200 | 25.12105 |
| 48.00000 | −.01534 | 11.14487 | 25.49118 |
| 49.00000 | −.03274 | 11.62544 | 25.84121 |
| 50.00000 | −.05571 | 12.11336 | 26.17204 |

| Lens back surface | | | |
|---|---|---|---|
| Semi-aperture (mm) | Deviation from best suited sphere (mm) | Deviation from tangent plane (mm) | Slope of surface degrees |
| 0.00000 | 0.00000 | 0.00000 | 0.00000 |
| 1.00000 | .00017 | .00047 | .05250 |
| 2.00000 | .00058 | .00179 | .09750 |
| 3.00000 | .00110 | .00383 | .13500 |
| 4.00000 | .00161 | .00646 | .16500 |
| 5.00000 | .00198 | .00954 | .18749 |
| 6.00000 | .00206 | .01296 | .20249 |
| 7.00000 | .00173 | .01657 | .20999 |
| 8.00000 | .00087 | .02025 | .20999 |
| 9.00000 | −.00067 | .02386 | .20248 |
| 10.00000 | −.00300 | .02727 | .18748 |
| 11.00000 | −.00623 | .03040 | .17254 |
| 12.00000 | −.01026 | .03334 | .16521 |
| 13.00000 | −.01495 | .03621 | .16549 |
| 14.00000 | −.02018 | .03916 | .17338 |
| 15.00000 | −.02581 | .04231 | .18888 |
| 16.00000 | −.03171 | .04580 | .21200 |
| 17.00000 | −.03774 | .04975 | .24273 |
| 18.00000 | −.04378 | .05431 | .28107 |
| 19.00000 | −.04968 | .05961 | .32703 |
| 20.00000 | −.05533 | .06577 | .38060 |
| 21.00000 | −.06058 | .07293 | .44093 |
| 22.00000 | −.06533 | .08120 | .50717 |
| 23.00000 | −.06949 | .09067 | .57933 |
| 24.00000 | −.07293 | .10146 | .65739 |
| 25.00000 | −.07557 | .11365 | .74137 |
| 26.00000 | −.07729 | .12737 | .83125 |
| 27.00000 | −.07801 | .14271 | .92705 |
| 28.00000 | −.07760 | .15977 | 1.02875 |
| 29.00000 | −.07597 | .17865 | 1.13635 |
| 30.00000 | −.07302 | .19947 | 1.24986 |
| 31.00000 | −.06868 | .22227 | 1.36065 |
| 32.00000 | −.06312 | .24691 | 1.46009 |
| 33.00000 | −.05653 | .27319 | 1.54818 |
| 34.00000 | −.04910 | .30090 | 1.62494 |
| 35.00000 | −.04104 | .32986 | 1.69035 |
| 36.00000 | −.03254 | .35986 | 1.74442 |
| 37.00000 | −.02380 | .39070 | 1.78716 |
| 38.00000 | −.01502 | .42219 | 1.81857 |
| 39.00000 | −.00640 | .45414 | 1.83864 |
| 40.00000 | .00188 | .48633 | 1.84738 |
| 41.00000 | .00953 | .51852 | 1.83409 |
| 42.00000 | .01606 | .55018 | 1.78805 |
| 43.00000 | .02090 | .58076 | 1.70926 |
| 44.00000 | .02347 | .60968 | 1.59771 |
| 45.00000 | .02319 | .63635 | 1.45339 |
| 46.00000 | .01951 | .66023 | 1.27630 |
| 47.00000 | .01183 | .68072 | 1.06642 |
| 48.00000 | −.00039 | .69727 | .82374 |
| 49.00000 | −.01775 | .70929 | .54825 |
| 50.00000 | −.04081 | .71621 | .23997 |

6. An optical system as claimed in claim 5, characterized in that for the enlargement of 6×, the best suited sphere for the screen has the radius −1200 mm and that the numerical data for the surface of the screen are as follows:

| Screen surface | | | |
|---|---|---|---|
| Semi-aperture (mm) | Deviation from best suited sphere (mm) | Deviation from tangent plane (mm) | Slope of surface degrees |
| 0.00000 | 0.00000 | 0.00000 | 0.00000 |
| 25.00000 | −.26030 | −.52074 | −2.38512 |
| 50.00000 | −1.03977 | −2.08189 | −4.75707 |
| 75.00000 | −2.33415 | −4.68020 | −7.10306 |
| 100.00000 | −4.13636 | −8.31029 | −9.41102 |
| 125.00000 | −6.43651 | −12.96468 | −11.66984 |
| 150.00000 | −9.22190 | −18.63381 | −13.86958 |
| 175.00000 | −12.47705 | −25.30604 | −16.00158 |
| 200.00000 | −16.18360 | −32.96764 | −18.05843 |
| 225.00000 | −20.32030 | −41.60276 | −20.03398 |
| 250.00000 | −24.86280 | −51.19333 | −21.92315 |
| 275.00000 | −29.78353 | −61.71888 | −23.72183 |
| 300.00000 | −35.05139 | −73.15637 | −25.42659 |
| 325.00000 | −40.63143 | −85.47991 | −27.03453 |
| 350.00000 | −46.48435 | −98.66030 | −28.54302 |
| 375.00000 | −52.56601 | −112.66467 | −29.94942 |
| 400.00000 | −58.82668 | −127.45580 | −31.25087 |
| 425.00000 | −65.21028 | −142.99146 | −32.44403 |
| 450.00000 | −71.65341 | −159.22360 | −33.52480 |
| 475.00000 | −78.08423 | −176.09734 | −34.48805 |
| 500.00000 | −84.42118 | −193.54992 | −35.32725 |
| 525.00000 | −90.57152 | −211.50938 | −36.03416 |
| 550.00000 | −96.42968 | −229.89317 | −36.59830 |
| 575.00000 | −101.87535 | −248.60656 | −37.00638 |
| 600.00000 | −106.77140 | −267.54084 | −37.24155 |
| 625.00000 | −110.96154 | −286.57140 | −37.28238 |
| 650.00000 | −114.26767 | −305.55553 | −37.10150 |
| 675.00000 | −116.48696 | −324.33012 | −36.66376 |
| 700.00000 | −117.38862 | −342.70907 | −35.92378 |
| 725.00000 | −116.71021 | −360.48051 | −34.82253 |
| 750.00000 | −114.15365 | −377.40381 | −33.28282 |
| 775.00000 | −109.38062 | −393.20637 | −31.20349 |
| 800.00000 | −102.00744 | −407.58008 | −28.45240 |
| 825.00000 | −91.59915 | −420.17771 | −24.85972 |
| 850.00000 | −77.66278 | −430.60887 | −20.21604 |
| 875.00000 | −59.63938 | −438.43577 | −14.28647 |
| 900.00000 | −36.89445 | −443.16881 | −6.86307 |

7. An optical system for a projector apparatus which is preferably adapted for projecting an image on a display screen with a generally negative curvature, characterized in that the system includes a lens with a generally convex front surface oriented towards the object plane and with a generally concave rear surface, in that the lens is provided with a diaphragm arranged behind the lens at a distance therefrom corresponding at least to the aperture of said diaphragm, and in that for a focal length of 230 mm, a lens diameter of 100 mm, a refractive index of 1.49166 for the lens, a lens-diaphragm distance of 18 mm and a lens thickness of 73 mm, the surfaces of the lens have the following numerical data, as related to a best suited sphere having the radius 108.804 mm for the front surface and the radius 1651.582 mm for the back surface:

| Lens front surface | | | |
|---|---|---|---|
| Semi-aperture (mm) | Deviation from best suited sphere (mm) | Deviation from tangent plane (mm) | Slope of surface degrees |
| 0.00000 | 0.00000 | 0.00000 | 0.00000 |
| 1.00000 | .00026 | .00485 | .55504 |
| 2.00000 | .00095 | .01933 | 1.10239 |
| 3.00000 | .00193 | .04330 | 1.64211 |
| 4.00000 | .00307 | .07662 | 2.17428 |
| 5.00000 | .00424 | .11919 | 2.69898 |
| 6.00000 | .00530 | .17087 | 3.21630 |
| 7.00000 | .00613 | .23154 | 3.72633 |
| 8.00000 | .00658 | .30108 | 4.22920 |
| 9.00000 | .00653 | .37940 | 4.72500 |
| 10.00000 | .00584 | .46636 | 5.21386 |
| 11.00000 | .00442 | .56189 | 5.70160 |
| 12.00000 | .00231 | .66607 | 6.19401 |
| 13.00000 | −.00043 | .77899 | 6.69117 |
| 14.00000 | −.00372 | .90074 | 7.19315 |
| 15.00000 | −.00749 | 1.03144 | 7.70000 |
| 16.00000 | −.01167 | 1.17119 | 8.21181 |
| 17.00000 | −.01618 | 1.32010 | 8.72863 |
| 18.00000 | −.02095 | 1.47829 | 9.25051 |

-continued

Lens front surface

| Semi-aperture (mm) | Deviation from best suited sphere (mm) | Deviation from tangent plane (mm) | Slope of surface degrees |
|---|---|---|---|
| 19.00000 | −.02591 | 1.64588 | 9.77752 |
| 20.00000 | −.03098 | 1.82298 | 10.30970 |
| 21.00000 | −.03607 | 2.00974 | 10.84872 |
| 22.00000 | −.04106 | 2.20633 | 11.39620 |
| 23.00000 | −.04582 | 2.41294 | 11.95216 |
| 24.00000 | −.05020 | 2.62976 | 12.51659 |
| 25.00000 | −.05408 | 2.85700 | 13.08948 |
| 26.00000 | −.05730 | 3.09486 | 13.67081 |
| 27.00000 | −.05975 | 3.34354 | 14.26055 |
| 28.00000 | −.06126 | 3.60326 | 14.85867 |
| 29.00000 | −.06171 | 3.87423 | 15.46513 |
| 30.00000 | −.06095 | 4.15667 | 16.07987 |
| 31.00000 | −.05890 | 4.45076 | 16.69456 |
| 32.00000 | −.05566 | 4.75647 | 17.30107 |
| 33.00000 | −.05141 | 5.07371 | 17.89966 |
| 34.00000 | −.04633 | 5.40241 | 18.49062 |
| 35.00000 | −.04057 | 5.74251 | 19.07424 |
| 36.00000 | −.03430 | 6.09395 | 19.65081 |
| 37.00000 | −.02769 | 6.45666 | 20.22066 |
| 38.00000 | −.02090 | 6.83061 | 20.78410 |
| 39.00000 | −.01410 | 7.21574 | 21.34148 |
| 40.00000 | −.00743 | 7.61203 | 21.89315 |
| 41.00000 | −.00114 | 8.01938 | 22.42867 |
| 42.00000 | .00426 | 8.43739 | 22.93793 |
| 43.00000 | .00816 | 8.86562 | 23.42181 |
| 44.00000 | .00998 | 9.30363 | 23.88119 |
| 45.00000 | .00913 | 9.75097 | 24.31693 |
| 46.00000 | .00501 | 10.20723 | 24.72993 |
| 47.00000 | −.00295 | 10.67200 | 25.12105 |
| 48.00000 | −.01534 | 11.14487 | 25.49118 |
| 49.00000 | −.03274 | 11.62544 | 25.84121 |
| 50.00000 | −.05571 | 12.11336 | 26.17204 |

Lens back surface

| Semi-aperture (mm) | Deviation from best suited sphere (mm) | Deviation from tangent plane (mm) | Slope of surface degrees |
|---|---|---|---|
| 0.00000 | 0.00000 | 0.00000 | 0.00000 |
| 1.00000 | .00017 | .00047 | .05250 |
| 2.00000 | .00058 | .00179 | .09750 |
| 3.00000 | .00110 | .00383 | .13500 |
| 4.00000 | .00161 | .00646 | .16500 |
| 5.00000 | .00198 | .00954 | .18749 |
| 6.00000 | .00206 | .01296 | .20249 |
| 7.00000 | .00173 | .01657 | .20999 |
| 8.00000 | .00087 | .02025 | .20999 |
| 9.00000 | −.00067 | .02386 | .20248 |
| 10.00000 | −.00300 | .02727 | .18748 |
| 11.00000 | −.00623 | .03040 | .17254 |
| 12.00000 | −.01026 | .03334 | .16521 |
| 13.00000 | −.01495 | .03621 | .16549 |
| 14.00000 | −.02018 | .03916 | .17338 |
| 15.00000 | −.02581 | .04231 | .18888 |
| 16.00000 | −.03171 | .04580 | .21200 |
| 17.00000 | −.03774 | .04975 | .24273 |
| 18.00000 | −.04378 | .05431 | .28107 |
| 19.00000 | −.04968 | .05961 | .32703 |
| 20.00000 | −.05533 | .06577 | .38060 |
| 21.00000 | −.06058 | .07293 | .44093 |
| 22.00000 | −.06533 | .08120 | .50717 |
| 23.00000 | −.06949 | .09067 | .57933 |
| 24.00000 | −.07293 | .10146 | .65739 |
| 25.00000 | −.07557 | .11365 | .74137 |
| 26.00000 | −.07729 | .12737 | .83125 |
| 27.00000 | −.07801 | .14271 | .92705 |
| 28.00000 | −.07760 | .15977 | 1.02875 |
| 29.00000 | −.07597 | .17865 | 1.13635 |
| 30.00000 | −.07302 | .19947 | 1.24986 |
| 31.00000 | −.06868 | .22227 | 1.36065 |
| 32.00000 | −.06312 | .24691 | 1.46009 |
| 33.00000 | −.05653 | .27319 | 1.54818 |
| 34.00000 | −.04910 | .30090 | 1.62494 |
| 35.00000 | −.04104 | .32986 | 1.69035 |
| 36.00000 | −.03254 | .35986 | 1.74442 |
| 37.00000 | −.02380 | .39070 | 1.78716 |
| 38.00000 | −.01502 | .42219 | 1.81857 |
| 39.00000 | −.00640 | .45414 | 1.83864 |
| 40.00000 | .00188 | .48633 | 1.84738 |
| 41.00000 | .00953 | .51852 | 1.83409 |
| 42.00000 | .01606 | .55018 | 1.78805 |
| 43.00000 | .02090 | .58076 | 1.70926 |
| 44.00000 | .02347 | .60968 | 1.59771 |
| 45.00000 | .02319 | .63635 | 1.45339 |
| 46.00000 | .01951 | .66023 | 1.27630 |
| 47.00000 | .01183 | .68072 | 1.06642 |
| 48.00000 | −.00039 | .69727 | .82374 |
| 49.00000 | −.01775 | .70929 | .54825 |
| 50.00000 | −.04081 | .71621 | .23997 |

8. An optical system as claimed in claim 7, characterized in that a pass filter is included to correct the intensity distribution of the light which is emitted from an object and passes the lens, substantially into symmetry with the spectrum sensitivity of the human eye.

9. An optical system as claimed in claim 8, characterized in that the filter is a short pass filter arranged to correct the light emitted by an object illuminated by a halogen lamp.

* * * * *